(12) United States Patent
Huang

(10) Patent No.: US 8,376,231 B2
(45) Date of Patent: Feb. 19, 2013

(54) INFRARED AND VISIBLE IMAGING OF DOCUMENTS

(75) Inventor: Jung-Chih Huang, San Jose, CA (US)

(73) Assignee: Document Capture Technologies, Inc., San Jose, CA (US)

( * ) Notice: Subject to any disclaimer, the term of this patent is extended or adjusted under 35 U.S.C. 154(b) by 769 days.

(21) Appl. No.: 12/423,455

(22) Filed: Apr. 14, 2009

(65) Prior Publication Data
US 2010/0258629 A1    Oct. 14, 2010

(51) Int. Cl.
G06K 7/08 (2006.01)
G06K 7/00 (2006.01)
G06K 9/00 (2006.01)

(52) U.S. Cl. ........ 235/449; 235/439; 235/493; 382/139; 382/140

(58) Field of Classification Search ................. 235/375, 235/435, 439, 449, 487, 493, 494; 382/137, 382/139, 140
See application file for complete search history.

(56) References Cited

U.S. PATENT DOCUMENTS

| | | | | |
|---|---|---|---|---|
| 6,654,487 | B1 * | 11/2003 | Downs, Jr. .................... | 382/139 |
| 7,092,561 | B2 * | 8/2006 | Downs, Jr. .................... | 382/139 |
| 7,215,414 | B2 * | 5/2007 | Ross ............... | 356/71 |
| 7,461,775 | B2 * | 12/2008 | Swift et al. .................... | 235/379 |
| 7,909,244 | B2 * | 3/2011 | Norris et al. .................. | 235/379 |
| 2002/0051562 | A1 | 5/2002 | Sheppard et al. | |
| 2002/0191830 | A1 * | 12/2002 | Pidhirny et al. ............... | 382/140 |
| 2003/0161523 | A1 | 8/2003 | Moon et al. | |
| 2004/0076320 | A1 | 4/2004 | Downs, Jr. | |
| 2005/0072903 | A1 | 4/2005 | Voss et al. | |
| 2005/0139670 | A1 | 6/2005 | McGlamery et al. | |
| 2005/0139671 | A1 | 6/2005 | McGlamery et al. | |
| 2006/0182332 | A1 | 8/2006 | Weber | |
| 2006/0186194 | A1 | 8/2006 | Richardson et al. | |
| 2007/0267477 | A1 | 11/2007 | Schott et al. | |
| 2008/0219543 | A1 | 9/2008 | Csulits et al. | |
| 2009/0145958 | A1 * | 6/2009 | Stoutenburg et al. ......... | 235/376 |

OTHER PUBLICATIONS

"FS531 Passport/Secure Document Scanner"; www.ambir.com; 2008; Ambir Technology Inc.
"International Paper Knowledge Center: Security Inks"; Tescstra Systems Corporation/Printing Tips.com; 2008; International Paper Company.
"IR Ink"; www.maxmax.com; Oct. 19, 2007; LDP LLC.
"MicrBATCH—Automatic Extraction of MICR Date from File Directories of Check Images Application"; www.allmypapers.com; Mar. 1, 2005; All My Papers.
Fulkerson, Jennifer; "Ink and Paper Take Center Ring in Security Market"; FORM Magazine; Jul. 1997.

* cited by examiner

*Primary Examiner* — Thien M Le
*Assistant Examiner* — April Taylor
(74) *Attorney, Agent, or Firm* — Blakely, Sokoloff, Taylor & Zafman LLP

(57) ABSTRACT

A payment item having a magnetic ink character recognition (MICR)-line on its front is handled by generating, using visible light, a front image of the front of the payment item, generating, using infrared light, an infrared image of the front of the payment item or of a portion of the front of the payment item containing its MICR-line, and performing optical character recognition on the infrared image to identify data encoded in the MICR-line.

12 Claims, 17 Drawing Sheets

INFRARED AND VISIBLE IMAGING OF DOCUMENTS

BACKGROUND OF THE INVENTION

Checks, money orders, bank drafts and other payment items are processed using Magnetic Ink Character Recognition (MICR) technology. In the case of checks, the MICR-encoded data may include an identification of the bank or institution that issued the check and the account number on which the check was drawn.

In general, data is encoded on a document by printing characters of a specialized font, for example, E-13B or CMC-7, on the document using magnetic ink or toner. The MICR characters are printed in a section of the document reserved for that use, often called the "MICR-line". A magnetic reader machine processes the document by magnetizing the characters. Each character, when magnetized, produces a unique magnetic signal due to the character's shape. The magnetic signal is recognized by the magnetic reader machine, which identifies—or "reads"—the character that has produced the signal. Even when the MICR characters or blank portions of the MICR-line have been overprinted with other marks such as cancellation stamps, the characters can be reliably read by magnetic scanning, because the other marks have not been made using magnetic ink or toner and therefore do not affect the magnetic signal created.

Check scanners that include an optical scanner to generate images of the front and back of the check and a magnetic reader to read the data stored in the MICR-line of the check are commercially available. Some of these check scanners incorporate software to perform optical character recognition (OCR) of the data stored in the MICR-line as a backup to the magnetic read. Some of these check scanners incorporate software for OCR of elements printed on the check using the OCR-A and OCR-B alphanumeric fonts.

Infrared is used in commercially available check scanners to detect the presence of a check to be scanned and to aid in mechanically feeding the check into the scanner.

Remote deposit is the ability to deposit checks into a bank account from one's home or office without having to physically deliver the actual check to the bank. This is typically accomplished by scanning digital images of the front and back of a check onto a computer and then transmitting the images to the bank. If it is possible to decode the MICR data on the check and provide that to the bank along with the images, clearing of the check is even faster, since it is not necessary for a bank employee to input that information into a clearing system, The SB1000 check and document scanner, commercially available from BankServ, Inc. of San Francisco, Calif., USA, is able to scan any two-sided color document ranging from the size of a business card up to legal-sized 8½ inch by 14 inch sheets. With front and back image sensors, the SB1000 scanner captures both sides of a check in a single pass. Using OCR technology, the scanner captures the MICR line and the dollar amount of a check so a remote deposit processor can digitally clear the check and can, if needed, create a substitute check (also known as an image replacement document) in compliance with the *Check Clearing for the 21st Century Act* (Check 21) that came into effect in the United States in 2004. The SB1000 scanner reads checks horizontally instead of lengthwise, thus saving up to two-thirds of the time it takes to read a typical check when compared with other check scanners. The SB1000 scanner weighs just over a pound, and uses only 2 watts of power when operating. It draws all the electricity it needs from a standard USB 2.0 port, making a separate power connection unnecessary.

United States Patent Publication No, 2002/0051562 to Sheppard et al., published May 2, 2002, is entitled "Scanning Method and Apparatus for Optical Character Reading and Information Processing". This publication discloses an automated check reading system. Two distinct and separate areas on each check to be scanned are illuminated by separate light sources. The MICR-line of the front of the check is illuminated only by an infrared light source. The remaining front surface of the check is illuminated only with a visible light source. A light baffle made from opaque plastic is positioned so that the visible light source will not illuminate the MICR-line of the check and that the infrared light source cannot illuminate check surface portions that are outside the MICR-line of the check. A check is inserted into the automated check reading system along its short edge, so that the check is scanned vertically. A transport mechanism advances the check so that adjacent vertical regions of the check are successively presented to the imaging station. While a particular vertical region is presented to the imaging station, the portion of the vertical region in the MICR-line is illuminated by the infrared light source and an image of the portion of the vertical region in the MICR-line is captured by a linear array optical sensor. Then, while the same particular vertical region is still presented to the imaging station, the remaining portion of the particular vertical region is illuminated by the visible light source and an image of the remaining portion of the particular vertical region is captured by the linear array optical sensor.

As described in U.S. Patent Publication No. 2002/0051562, the linear array optical sensor derives a pair of separate and distinct video signals. The video signal resulting from scanning the vertical regions of the MICR-line of the check are processed by MICR character recognition circuitry to output MICR character data. The video signal resulting from scanning the remaining portions of the vertical regions is processed by bit image compression circuitry to derive a monochromatic image of the check in which the MICR-line is absent. In the best mode proposed in U.S. Patent Publication No. 2002/0051562, the sensor does not scan the entire document, but scans only 3.200 inches of the check height. Specifically, the top 0.273 inches of a 3.660 inch high check will not be imaged, even though about 0.150 inches of that is information-containing surface.

As noted in U.S. Patent Publication No. 2002/0051562, "When a customer fills out a check at the point of sale, it is entirely possible that portions of the signature or descriptive notes may descend into the MICR portion of the check. Such hand-written marks could make the MICR characters unidentifiable unless a way is found to separate the hand-written marks from the printed MICR characters. However, MICR ink absorbs infrared light, while the majority of inks used in ball point pens do not absorb infrared light. Wherefore MICR characters are illuminated with infrared light, to insure that hand-written marks or ink smudges will not be visible to the sensor array 10." If a portion of the signature or descriptive notes descend into the MICR-line of the check, those portions of the signature or descriptive notes will be absent from the monochromatic image of the check. In other words, the monochromatic image of the check will lack the complete signature or the complete descriptive notes.

Commercially available document scanners for "secure" documents scan infrared ink and digital "watermarked" items commonly used in passports, driver's licenses, identification cards, and bank notes. Such scanners may be operated in a color mode, in a black-and-white mode, or in an infrared mode. In the color mode, the scan is conducted using visible light and the output is a color image of the scanned document. In the black-and-white mode, the scan is conducted using visible light and the output is a black-and-white or grayscale image of the scanned document. In the infrared mode, the scan is conducted using infrared light and the output is a black-and-white or grayscale image of the scanned document.

BRIEF DESCRIPTION OF THE DRAWINGS

FIG. 11-1 is a simplified illustration of an optical arrangement in an imaging device;

FIGS. 11-2, 11-3, 11-4, 11-5 are illustrations of light sources for the imaging device of FIG. 11-1;

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of the technology. However it will be understood by those of ordinary skill in the art that the embodiments of the invention may be practiced without these specific details. In other instances, well-known methods, procedures, components and circuits have not been described in detail so as not to obscure the embodiments of the invention.

Figure 1:
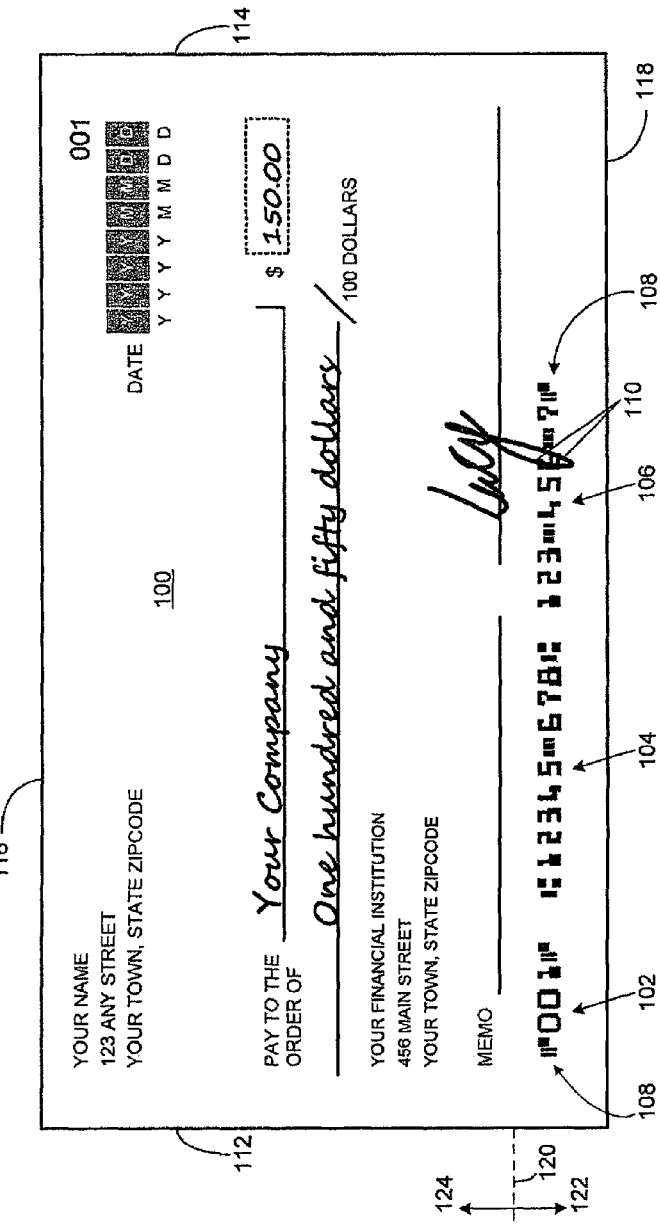
FIG. 1 is an illustration of a sample personal check.

FIG. 1 is an illustration of a front of a sample personal check 100. MICR-encoded data 102, 104 and 106 have been printed in magnetic ink in a MICR-line 108 of check 100 using characters of a MICR font. A mark 110 made by pen ink is visible in MICR-line 108 and partially obscures MICR-encoded data 106. Since the pen ink is not magnetic ink, mark 110 is unlikely to adversely affect the readability of MICR-encoded data 106 by a magnetic reader machine.

Figure 2:
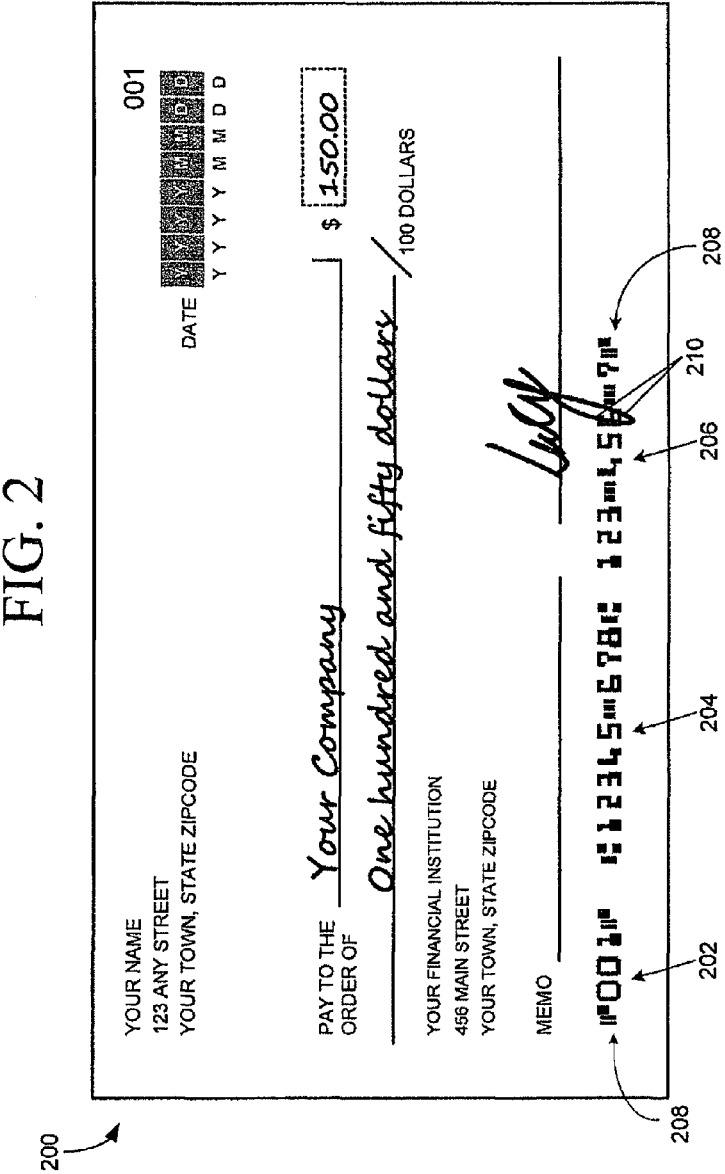
FIG. 2 is an illustration of a digital image of the front of check of FIG. 1, generated using visible light.

FIG. 2 is an illustration of a digital image 200 of the front of check 100, generated using visible light. Digital image 200 includes a portion 208 corresponding to MICR-line 108. Portion 208 includes regions 202, 204 and 206 corresponding to MICR-encoded data 102, 104 and 106, respectively. Region 206 includes lines 210 corresponding to mark 110. Performing optical character recognition (OCR) on portion 208 of digital image 200 may result in errors, since lines 210 adversely affect the readability of MICR-encoded data 106 by OCR. However, digital image 200 is still useful, for example, for digital clearing of the check and for the creation of a substitute check (also known as an image replacement document) in compliance with the *Check Clearing for the 21st Century Act* (Check 21) that came into effect in the United States in 2004.

Figure 3:
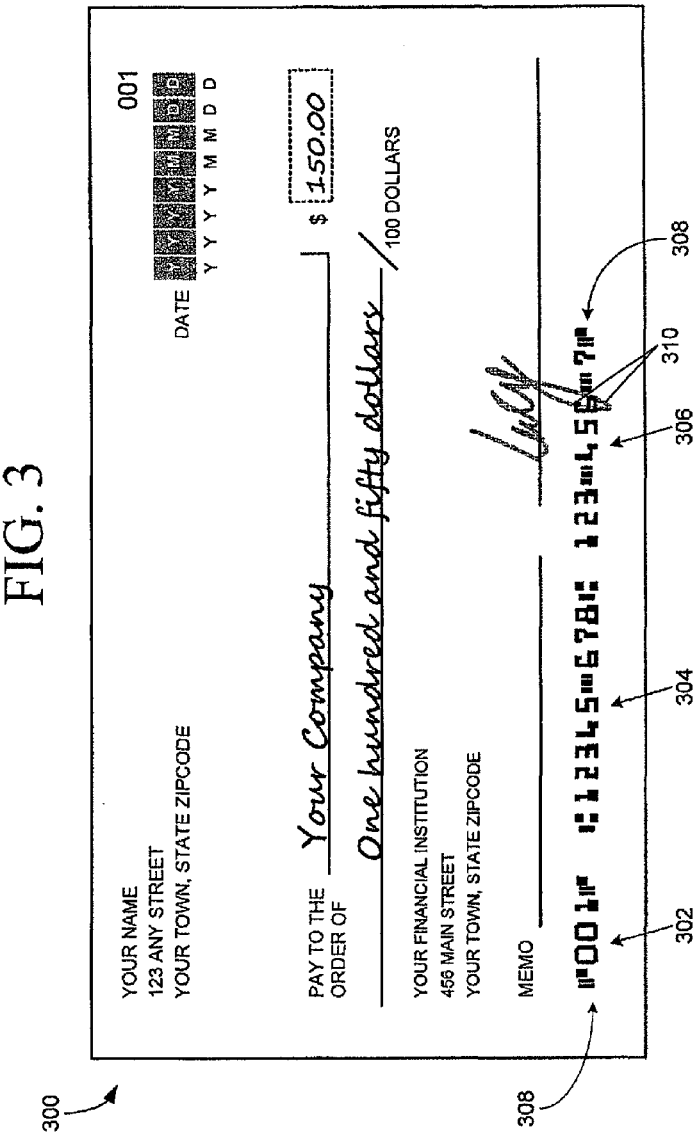
FIG. 3 is an illustration of a digital image of the front of check of FIG. 1, generated using infrared light.

FIG. 3 is an illustration of a digital image 300 of the front of check 100, generated using infrared light. Infrared image 300 includes a portion 308 corresponding to MICR-line 108. Portion 308 includes regions 302, 304 and 306 corresponding to MICR-encoded data 102, 104 and 106, respectively. Mark 110, and all other marks on the front of check 100 made with the same pen ink as mark 110, may be completely suppressed in infrared image 300, in which case no lines corresponding to mark 110 will be present in region 306. However, to aid the reader in understanding the described technology, it is assumed that mark 110, and all other marks on the front of check 100 made with the same pen ink, have been effectively but not completely suppressed in infrared image 300, Region 306 therefore includes lines 310 corresponding to mark 110, where lines 310 have a higher gray level than lines 210. In other words, by imaging the front of check 100 using infrared light, the contrast between mark 110 and MICR-encoded data 106 has been enhanced. If OCR is performed on portion 308 of infrared image 300, the readability of MICR-encoded data 106 is enhanced relative to the readability of MICR-encoded data 106 by performing OCR on portion 208 of digital image 200. It is therefore less likely that performing OCR on portion 308 will result in errors than performing OCR on portion 208. More generally, performing OCR on an infrared image or portion thereof containing the MICR-line may reduce the error-rate of identification of MICR-encoded data. The identified data corresponding to MICR-encoded data 102, 104 and 106 which results from performing OCR on portion 308 may be used together with a) digital image 200, and b) a digital image of the back of check 100 generated using visible light, for digital clearing of the check and for the creation of a substitute check in compliance with Check 21.

Figure 4:
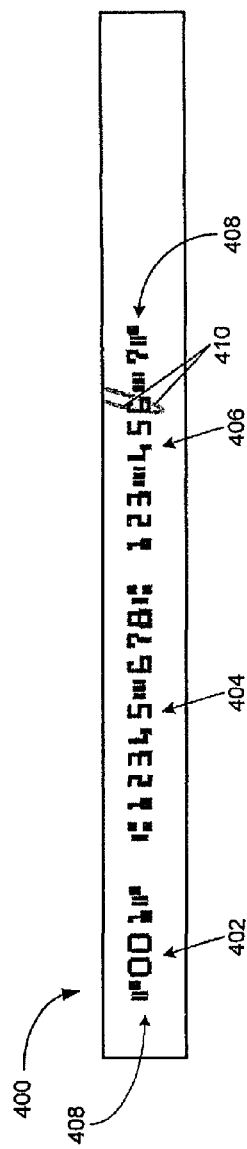
FIG. 4 is an illustration of a digital image of a portion of the front of check of FIG. 1, generated using infrared light.

As an alternative to generating a complete, or substantially complete, image of the front of check 100 using infrared light, it is sufficient to generate an infrared image of a portion of the front of check 100 that includes MICR-line 108. FIG. 4 is an illustration of a digital image 400, generated using infrared light of a portion of the front of check 100 that includes MICR-line 108. Infrared image 400 includes a portion 408 corresponding to MICR-line 108. Although the term "portion" is used, in some implementations portion 408 may comprise the entirety of infrared image 400. Portion 408 includes regions 402, 404 and 406 corresponding to MICR-encoded data 102, 104 and 106, respectively. Mark 110 may be completely suppressed in infrared image 400, in which case no lines corresponding to mark 110 will be present in region 406. However, to aid the reader in understanding the described technology, it is assumed that mark 110 has been effectively but not completely suppressed in infrared image 400. Region 406 therefore includes lines 410 corresponding to mark 110, where lines 410 have a higher gray level than lines 210. In other words, by imaging the portion of the front of check 100 that includes MICR-line 108 using infrared light, the contrast between mark 110 and MICR-encoded data 106 has been enhanced. If OCR is performed on portion 408 of infrared image 400, the readability of MICR-encoded data 106 is enhanced relative to the readability of MICR-encoded data 106 by performing OCR on portion 208 of digital image 200. It is therefore less likely that performing OCR on portion 408 will result in errors than performing OCR on portion 208. The identified data corresponding to MICR-encoded data 102, 104 and 106 which results from performing OCR on portion 408 may be used together with a) digital image 200, and b) a digital image of the back of check 100 generated using visible light, for digital clearing of the check and for the creation of a substitute check in compliance with Check 21.

Figure 5:
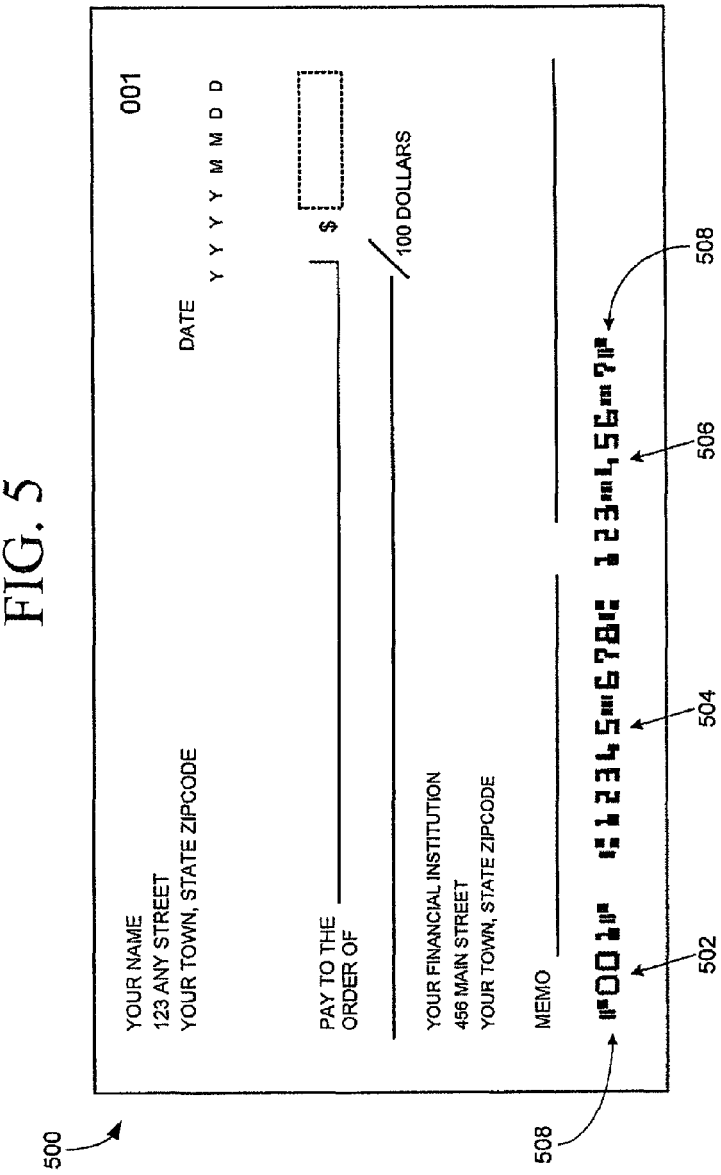
FIG. 5 is an illustration of the digital image illustrated in FIG. 3, after undergoing image processing techniques.

Readability of MICR-encoded data 102, 104 and 106 may be improved through the use of image processing techniques on infrared image 300 (or infrared image 400). For example, FIG. 5 is an illustration of a digital image 500, which is the result of performing image processing techniques on infrared image 300. In this example, a threshold filter has been applied to infrared image 300 to eliminate pixels having a gray level higher than the threshold. In one example, the threshold may be fixed. In another example, the threshold may be adaptive. Infrared image 300 may be analyzed to assess the intensity or gray level of at least a portion of the MICR-encoded data, and the threshold may be set at a safe level above this gray level. Other image processing techniques may also be used to increase the probability of improving readability of the MICR-encoded data. For example, the "quality" of image 300 may be lower than that of image 200 in the sense that the portion corresponding to the MICR-line may be more blurry. A sharpening filter, for example, may be applied to image 300, before or after application of a threshold filter. Processed image 500 includes a portion 508 corresponding to MICR-line 108. Portion 508 includes regions 502, 504 and 506 corresponding to MICR-encoded data 102, 104 and 106, respectively. Mark 110, and all other marks on the front of check 100 made with the same pen ink as mark 110, have been completely suppressed in processed image 500. If OCR is performed on portion 508 of processed image 500, the readability of MICR-encoded data 106 is enhanced relative to the readability of MICR-encoded data 106 by performing OCR on portion 208 of digital image 200. It is therefore less likely that performing OCR on portion 508 will result in errors than performing OCR on portion 208. More generally, performing OCR on a processed infrared image or portion thereof containing the MICR-line may reduce the error-rate of identification of MICR-encoded data. The identified data corresponding to MICR-encoded data 102, 104 and 106 which results from performing OCR on portion 508 may be used together with a) digital image 200, and b) a digital image of the back of check 100 generated using visible light, for digital clearing of the check and for the creation of a substitute check in compliance with Check 21.

Tests were conducted using readily-available pens to create marks in the MICR line of various checks. All of the pens used ink that was not designed to be undetectable when illuminated by infrared light and was not designed to be undetectable by sensors that are responsive to an infrared range of the radiation spectrum. A digital image of the front of each check was generated using visible light, and an infrared image of the front of each check was generated using infrared light. For all of the pens tested, the mark in the MICR line was clearly visible in the image generated using visible light. For all but two of the pens tested, the mark in the MICR line made using the pen ink was effectively suppressed in the infrared image. For one of the pens tested, the mark in the MICR line was not effectively suppressed in the infrared image, and for another of the pens tested, the mark in the MICR line was only partially suppressed in the infrared image.

The specific test results are provided in Table 1.

TABLE 1

| Pen Manufacturer | Model | Style | Color | Visible Image | Infrared Image |
|---|---|---|---|---|---|
| BIC | Round Stic | Medium | Blue | Good | Good |
| UNI-BALL | Vision | Fine | Blue | Good | Good |
| UNI-BALL | Vision | Exact | Green | Good | Good |
| Paper Mate | Ball Point | Medium | Blue | Good | Good |
| UNI-BALL | Sanford | Micro | Black | Good | Good |
| UNI-BALL | Vision | Elite | Blue | Good | Good |
| Foray | Point | Medium | Black | Good | Good |
| Sanford | Sharpie | Ultra-Fine | Black | Good | Marginal |
| Pentel | RSVP | Medium | Blue | Good | Good |
| Pilot | Precise V5 | Extra-Fine | Black | Good | Good |
| Paper Mate | Ball Point | Medium | Black | Good | Good |
| UNI-BALL | Vision Elite | Fine | Black | Good | Failed |
| FORAY | Ball-point | Medium | Blue | Good | Good |
| UNI-BALL | Vision Exact | Fine | Blue | Good | Good |
| Paper Mate | ComfortMate | Medium | Blue | Good | Good |
| Paper Mate | Flex-Grip | Medium | Black | Good | Good |
| Paper Mate | Ball-point | Medium | Black | Good | Good |
| Paper Mate | Xtend | Medium | Black | Good | Good |
| Pilot | Precise V Rolling ball | Extra-Fine | Blue | Good | Good |
| BIC | Round Stic | Medium | Black | Good | Good |

Figure 6:
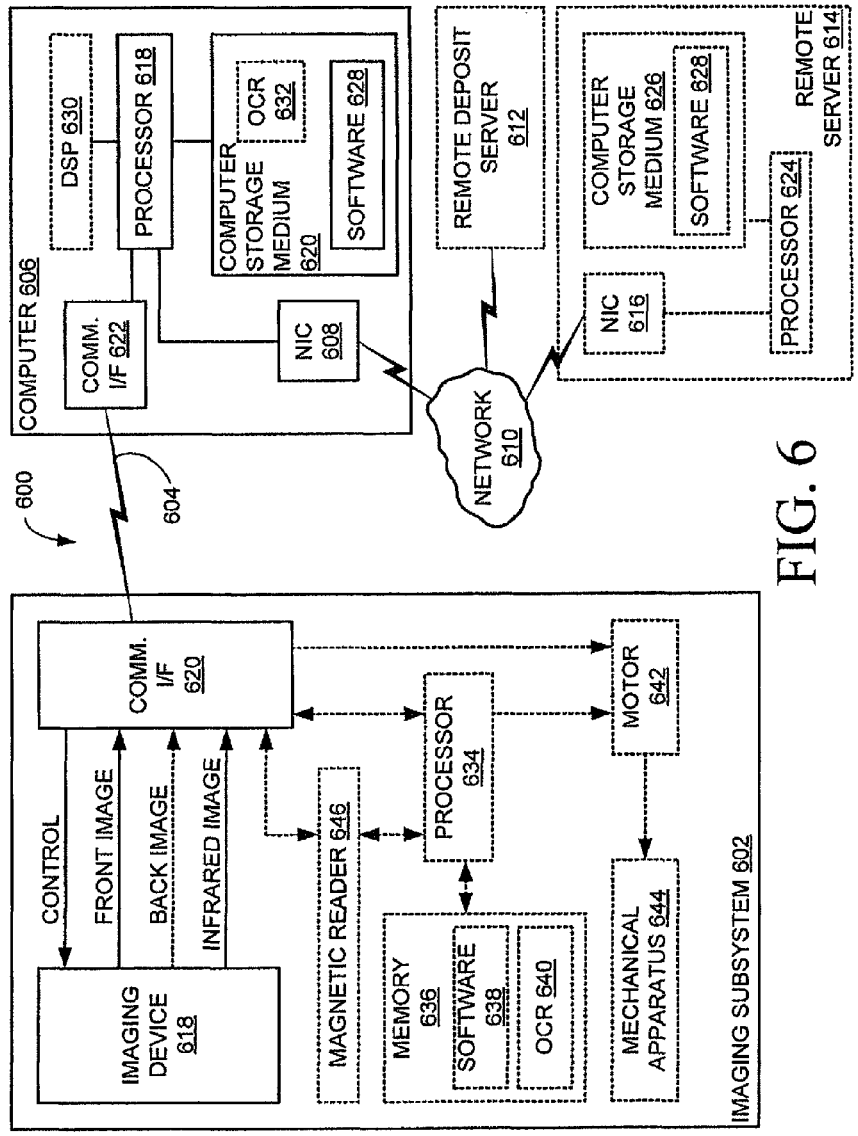
FIG. 6 is a block diagram of a system for handling a payment item having a magnetic ink character recognition (MICR)-line.

FIG. 6 is a block diagram of a system 600 for handling a payment item having a MICR-line on its front. A non-exhaustive list of examples of such a payment item includes a check, a money order, a bank draft, an inter-member debit, a settlement voucher, a government savings bond, a gift certificate, a paper pre-authorized debit, a lottery ticket and the like.

System 600 comprises an imaging subsystem 602 coupled via a communication link 604 to a computer 606. Optionally, computer 606 comprises a network interface card (NIC) 608 through which it is able to be coupled to a network 610. A remote deposit server 612 may be coupled to network 610. An optional remote server 614 comprises a NIC 616 through which it is able to be coupled to network 610. Network 610 may include any combination of networks, including intranets and the Internet.

Computer 606 comprises a processor 618 coupled to MC 608, a computer storage medium 620 coupled to processor 618, and a communication interface 622 coupled to processor 618. Remote server 614 comprises a processor 624 coupled to MC 616, and a computer storage medium 626 coupled to processor 624. Computer storage media may include any combination of volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information.

Computer 606 may comprise additional components, but these are not shown and are not discussed in order not to obscure the technology described herein. Remote server 614 may comprise additional components, but these are not shown and are not discussed in order not to obscure the technology described herein.

Software 628 is stored in computer storage medium 620. Software 628 is comprised of computer-executable instructions, such as program modules, to be executed by processor 618 of computer 606. Generally, program modules include routines, programs, objects, components, data structures, etc. that perform particular tasks or implement particular abstract data types. Typically the functionality of the program modules may be combined or distributed as desired in various implementations. Software 628 may be available for download via network 610 from remote server 614, and therefore software 628 may be stored in computer storage medium 626.

Imaging subsystem 602 comprises an imaging device 618 and a communication interface 620. Communications between imaging subsystem 602 and computer 606 are conducted via communication interface 620 and communication interface 622 over communication link 604. Communication link 604 is any suitable wired, wireless or optical link. For example, communication interfaces 620 and 622 may be USB interfaces or IEEE 1394 interfaces (known by the brand names of FireWire, i.LINK and Lynx). In another example, communication interfaces 620 and 622 may be wireless communication interfaces.

Imaging device 618 is able to generate, using visible light, a front image of the front of the payment item. Imaging device 618 is also able to generate, using infrared light, an infrared image of the front of the payment item. Imaging device 618 may optionally be able to generate, using visible light, a back image of the back of the payment item. Alternatively, imaging subsystem 602 may comprise another imaging device (not shown) that is able to generate, using visible light, a back image of the back of the payment item. Alternatively, imaging subsystem 602 is not able to generate, using visible light, a back image of the back of the payment item.

Optionally, imaging subsystem 602 may comprise a processor 634 coupled to communication I/F 620 and a memory 636 coupled to processor 630. Processor 634 may incorporate a microprocessor, a Digital Signal Processor (DSP), a microcontroller or any combination thereof Memory 636 may include any combination of volatile and nonvolatile, removable and non-removable media implemented in any method or technology for storage of information such as computer readable instructions, data structures, program modules or other data. Memory 636 may include RAM, ROM, EEPROM, flash memory or other memory technology. Software 638 may optionally be stored in memory 636. Software 638 may be comprised of computer-executable instructions, such as program modules, to be executed by processor 634 of imaging subsystem 602.

Software 638 may be firmware and/or software for processor 634 to control at least some of the functionality of the imaging subsystem. In one example, portions of the firmware and/or software may be permanently stored in memory 636. In another example, portions of the firmware and/or software may be downloadable via communication link 604.

Therefore, control of the operation of the imaging subsystem, buffering of data, e.g. portions of the scanned images, and/or application of image filters or even OCR to portions of the scanned images, may be distributed in any desired way between software 628 and software 638. Distribution of functionality may be driven by different considerations, for example, performance and distribution of cost.

For example, an OCR software module 632 may be stored in computer storage medium 620 for execution by processor 618 or alternatively by a DSP (Digital Signal Processor) 630 of computer 606. In another example, an OCR software module 640 may be stored in memory 636 for execution by processor 634. In a further example, OCR software module 632 may be stored in computer storage medium 620 and OCR software module 640 may be stored in memory 636. Any OCR tasks executions described herein may be executed by OCR software module 632 and/or by OCR software module 640 and/or by both in any desired division of labor.

Imaging subsystem 602 may optionally include a motor 642 and a mechanical apparatus 644, coupled to motor 642. Motor 642 may be able to control motion of mechanical apparatus 644, which in turn may be able to advance position of a payment item to be imaged relative to imaging device 618. In one well known example, imaging subsystem may be a "flat bed" scanner and mechanical apparatus 644 may be arranged to advance imaging device 618 relative to a stationary payment item (not shown). In another well known example, imaging subsystem 602 may be a scanner using a feeder and mechanical apparatus 644 may be arranged to advance a payment item relative to a stationary imaging device 618.

In one example, motor 642 may be controlled by computer 606 via communication I/F 620. In another example, motor 642 may be controlled by processor 634 or a logical state machine implemented in imaging subsystem 602. Motor 642 may be, for example, a step motor, an AC (alternate current) motor or a DC (direct current) motor. In the examples of the flat bed scanner and the scanner using a feeder, the relative position of the payment item versus imaging device 618 may be advanced with an amount needed for scanning in a desired resolution. For example, different amounts of advancement may be desired if scanning at a 100 dpi (dot per inch) resolution or at a 300 dpi resolution.

Optionally, imaging system 602 may also include a magnetic reader 646 for magnetically reading MICR-encoded data from payment items such as checks. Magnetic reader 646 may be controlled by processor 634 and/or via communication interface 620.

Figure 7:
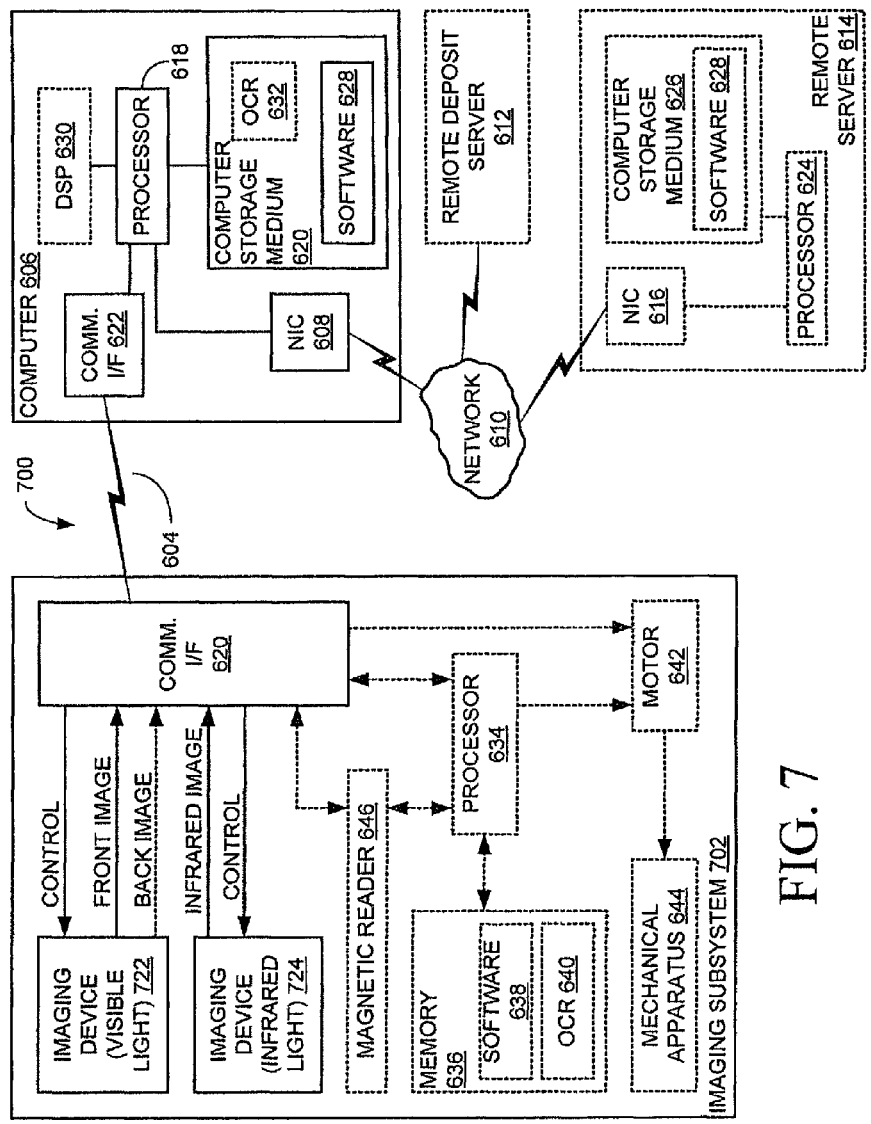
FIG. 7 is a block diagram of another system for handling a payment item having a MICR-line.

FIG. 7 is a block diagram of another system for handling a payment item having a MICR-line on its front. A system 700 differs from system 600 in that system 700 comprises an imaging subsystem 702 instead of imaging subsystem 602. Imaging subsystem 702 comprises communication interface 620, a visible-light imaging device 722 and an infrared-light imaging device 724.

Imaging device 722 is able to generate, using visible light, a front image of the front of the payment item. Imaging device 724 is able to generate, using infrared light, an infrared image of the front of the payment item. Imaging device 722 may optionally be able to generate, using visible light, a back image of the back of the payment item. Alternatively, imaging subsystem 702 may comprise another imaging device (not shown) that is able to generate, using visible light, a back image of the back of the payment item. Alternatively, imaging subsystem 702 is not able to generate, using visible light, a back image of the back of the payment item. Imaging subsystem 702 may optionally comprise any or a combination of processor 634, memory 636, motor 642, mechanical apparatus 644, and magnetic reader 646, as described above with respect to FIG. 6.

Figure 8:
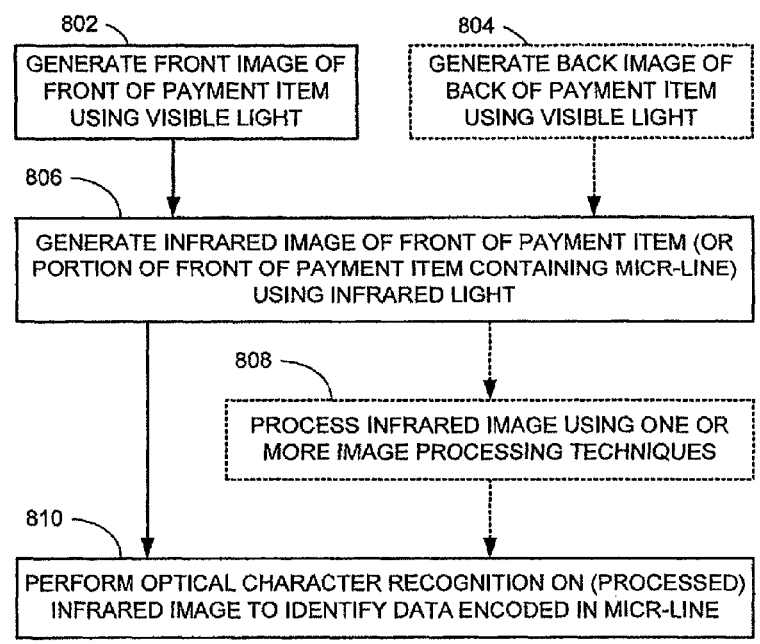
FIG. 8 is an illustration of a method for handling a payment item having a MICR-line.
Figure 9:
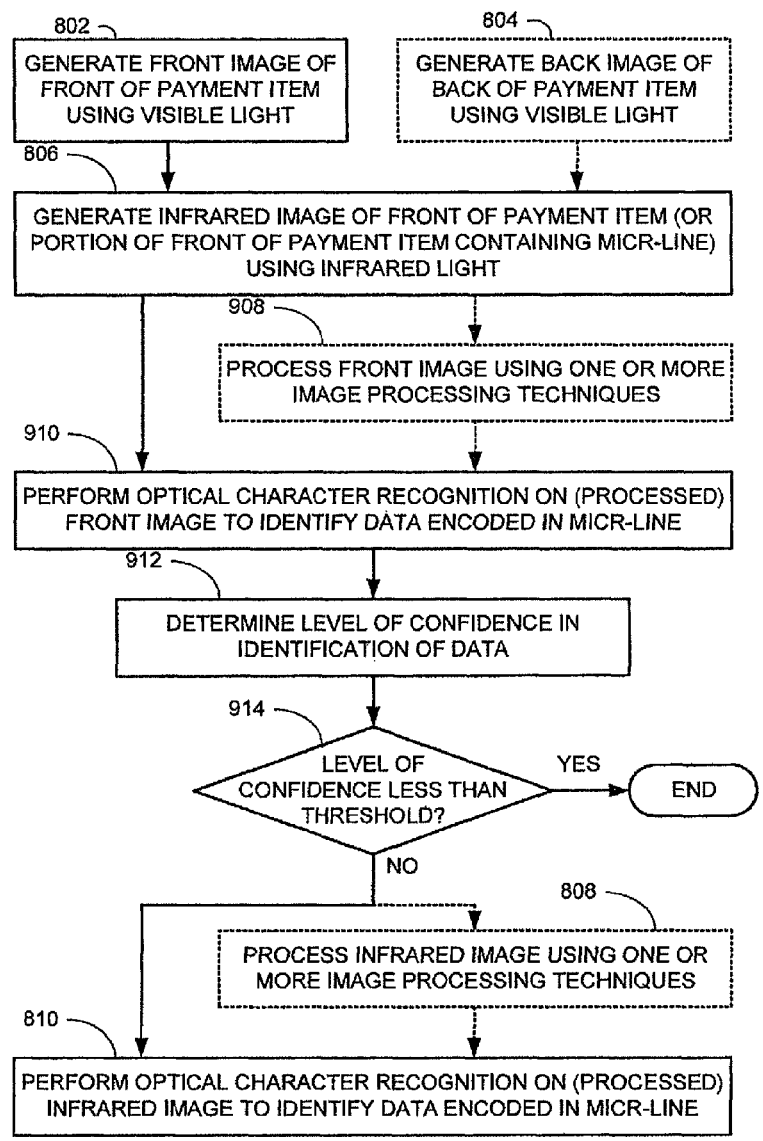
FIG. 9 is an illustration of another method for handling a payment item having a MICR-line.
Figure 10:
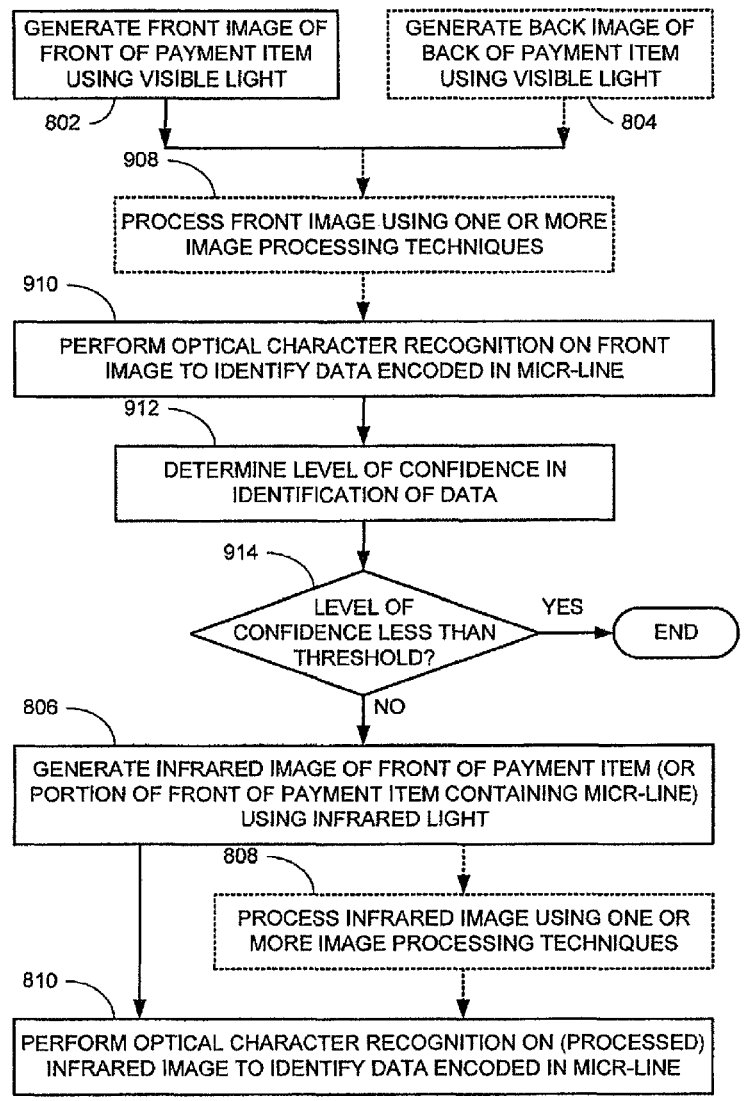
FIG. 10 is an illustration of yet another method for handling a payment item having a MICR-line.

The operation of system 600 and system 700 may be understood with reference to the methods illustrated in FIG. 8, FIG. 9 and FIG. 10. Software 628 or software 638 or both control the operation of imaging subsystem 602,702 including the control of imaging device 618,722,724 (via communication interface 620). As described above with respect to FIG. 6, functionality may be distributed in any desired way between software 628 and software 638. Therefore, software 628 alone, or software 638 alone, or software 628 and software 638 jointly, may implement or enable the implementation of the methods illustrated in any of FIG. 8, FIG. 9 and FIG. 10.

FIG. 8 is an illustration of a method for handling a payment item having a MICR-line on its front. At 802, imaging device 618,722 generates, using visible light, a front image of the front of the payment item. Optionally, at 804, imaging device 618,722 generates, using visible light, a back image of the back of the payment item. At 806, imaging device 618,724 generates, using infrared light, an infrared image of the front of the payment item or of a portion of the front of the payment item that contains the MICR-line.

The front image and the back image may be generated simultaneously or concurrently, as will be the case, for example, if imaging device 618,722 is a duplex scanner and scanning the front and back of the payment item is accomplished with a single pass of the payment item through the duplex scanner. Alternatively, the front image and the back image may be generated at different times. There is no requirement that the front image be generated prior to the back image, and there is no requirement that the back image be generated prior to the front image.

In the case of imaging device 618, the front image and the infrared image may be generated simultaneously or concurrently, as will be discussed in more detail below with respect to FIG. 14. Alternatively, whether for imaging device 618 or for imaging devices 722 and 724, the front image and the infrared image may be generated at different times. There is no requirement that the front image be generated prior to the infrared image, and there is no requirement that the infrared image be generated prior to the front image.

The front image, the back image and the infrared image may be generated in a single pass of the payment item through imaging device 618.

Imaging devices 618, 722, 724 may each comprise one or more digital cameras, so that generating the front image is accomplished by digitally photographing the front of the payment item using visible light, generating the optional back image is accomplished by digitally photographing the back of the payment item using visible light, and generating the infrared image is accomplished by digitally photographing the portion or the front of the payment item using infrared light.

Alternatively, imaging devices 618, 722, 724 may each comprise a scanner, so that generating the front image is accomplished by scanning the front of the payment item using visible light, generating the optional back image is accomplished by scanning the back of the payment item using visible light, and generating the infrared image is accomplished by scanning the portion or the front of the payment item using infrared light. As is known in the art, if imaging device 618, 722, 724 is a scanner, imaging device 618, 722, 724 may optionally include motor 642 and mechanical apparatus 644 for advancing the payment item through imaging device 618, 722, 724, or, in the case of a "flat bed scanner", for advancing at least portions of imaging device 618, 722, 724 across the payment item.

It is also contemplated that one of imaging devices 722 and 724 is a digital camera and the other of imaging devices 722 and 724 is a scanner.

As is known in the art, if imaging device 618, 722, 724 comprises a scanner, the images generated by the scanner may be generated line by line, so that line images are sent from imaging subsystem 602, 702, and the complete or substantially complete images are assembled in computer 606 from the line images. The width of a line will depend on the active area of the sensor in the imaging device. The line-by-line scanning may be performed one horizontal line at a time. A horizontal line may be defined as extending approximately from one side edge of a payment item to the opposite side edge of the payment item and being substantially parallel to a top edge of the payment item. The line-by-line scanning may be performed one vertical line at a time. A vertical line may be defined as extending approximately between a top edge of the payment item and a bottom edge of the payment item and being substantially parallel to a side edge of the payment item. Referring briefly to FIG. 1, side edges 112 and 114, top edge 116 and bottom edge 118 of check 100 are illustrated. Referring briefly to FIG. 6 and FIG. 7, some or all control of the scanner's optical, electronic and mechanical components may originate with software 628, although control signals may be translated by drivers implemented in computer 606 or in imaging subsystem 602, 702. Some or all control of the scanner's optical, electronic and mechanical components may originate with software 638, although control signals may be translated by drivers implemented in imaging subsystem 602,702.

Returning now to FIG. 8, optionally at 808, computer 606 processes the infrared image using one or more image processing techniques. Software 628 may comprise computer-executable instructions which, when executed by processor 618, process the infrared image. Alternatively or additionally, computer 606 may comprise special-purpose hardware, for example, a digital signal processor 630, to process the infrared image. Software 628 may control computer 606 to use the special-purpose hardware to process the infrared image. It is also contemplated that one or more portions or all of the infrared image may be processed within imaging subsystem 602,702 using one or more image processing techniques, as an alternative or in addition to the image processing done by computer 606. For example, image processing performed within imaging subsystem 602,702 may accomplished by executing software 638 by processor 634. Processing the infrared image may occur anytime after generating the infrared image and anytime before performing OCR on the infrared image, regardless of when the front image is generated and regardless of when the optional back image is generated. It is contemplated that image processing of portions of the infrared image may begin before all of the infrared image has been generated. For example in the case of line-by-line scanning, line images may be buffered and processed while other line images are being generated.

At 810, computer 606 performs optical character recognition (OCR) on the infrared image generated by imaging device 618,724 using OCR software module 632 stored in computer storage medium 620. It is also contemplated that OCR may be performed on portions or all of the infrared image using OCR software module 640 stored in memory 636, as an alternative or in addition to the OCR performed using OCR software module 632. The infrared image on which the OCR is performed may be the processed image resulting from use of the image processing techniques. One purpose of performing OCR on the infrared image is to identify data encoded in the MICR-line of the payment item.

FIG. 9 is an illustration of another method for handling a payment item having a MICR-line on its front. Elements of the method illustrated in FIG. 9 which are similar to those of the method illustrated in FIG. 8 are indicated with the same reference numerals. Unless indicated otherwise, all comments made in the description above to those elements are applicable also to the elements when forming part of the method illustrated in FIG. 9.

At 802, imaging device 618,722 generates, using visible light, a front image of the front of the payment item. Optionally, at 804, imaging device 618,722 generates, using visible light, a back image of the back of the payment item. At 806, imaging device 618,724 generates, using infrared light, an infrared image of the front of the payment item or of a portion of the front of the payment item that contains the MICR-line.

Optionally at 908, computer 606 processes the front image using one or more image processing techniques. Software 628 may comprise computer-executable instructions which, when executed by processor 618, process the front image. Alternatively or additionally, computer 606 may comprise special-purpose hardware, for example, digital signal processor 630, to process the front image. Software 628 may control computer 606 to use the special-purpose hardware to process the front image. It is also contemplated that one or more portions or all of the front image may be processed within imaging subsystem 602,702 using one or more image processing techniques, as an alternative or in addition to the image processing done by computer 606. For example, image processing performed within imaging subsystem 602,702 may be accomplished by executing software 638 by processor 634. Processing the front image may occur anytime after generating the front image and anytime before performing OCR on the front image, regardless of when the infrared image is generated and regardless of when the optional back image is generated. It is contemplated that image processing of portions of the front image may begin before all of the front image has been generated. For example, in the case of line-by-line scanning, line images may be buffered and processed while other line images are being generated.

At 910, computer 606 performs OCR on the front image generated by imaging device 618,722 using OCR software module 632. It is also contemplated that OCR may be performed on portions or all of the front image using OCR software module 640 stored in memory 636, as an alternative or in addition to the OCR performed using OCR software module 632. The front image on which the OCR is performed may be the processed image resulting from the use of the image processing techniques. One purpose of performing OCR on the front image is to identify data encoded in the MICR-line of the payment item.

At 912, software 628 determines a level of confidence in the identification of the data based on the (optionally processed) front image. Criteria for determining the level of confidence may be gleaned from experience generating images of M(CR-lines, performing OCR on the (optionally processed) images, and comparing the results of the OCR with the actual MICR-encoded data. If, as checked at 914, the level of confidence meets or exceeds a threshold, the method ends, and the data as identified at 910 is used. However, if, as checked at 914, the level of confidence is less than the threshold, the method proceeds to 810, where OCR is performed on the infrared image generated by imaging device 618,724. The infrared image may optionally be processed using one or more image processing techniques at 808. Processing the infrared image may occur anytime after generating the infrared image and anytime before performing OCR on the infrared image, regardless of when the front image is generated, regardless of when the optional back image is generated, and regardless of when the level of confidence is determined and tested.

FIG. 10 is an illustration of yet another method for handling a payment item having a MICR-line on its front. Elements of the method illustrated in FIG. 10 which are similar to those of the methods illustrated in FIG. 8 and FIG. 9 are indicated with the same reference numerals. Unless indicated otherwise, all comments made in the description above to those elements are applicable also to the elements when forming part of the method illustrated in FIG. 10. The method illustrated in FIG. 10 differs from the method illustrated in FIG. 9 in that generating the infrared image occurs only after it has been determined that the level of confidence in the identification of the data from performing OCR on the front image is less than the threshold.

Examples of image processing techniques that may be used include any or any combination of the following: sharpening the image; filtering the image to eliminate pixels having a gray level higher than a threshold; binarization to convert the image from color or grayscale to black-and-white; de-speckle to clean up high frequency noise on the image; image de-skew; and image alignment and rotation.

Figures 1, 11:
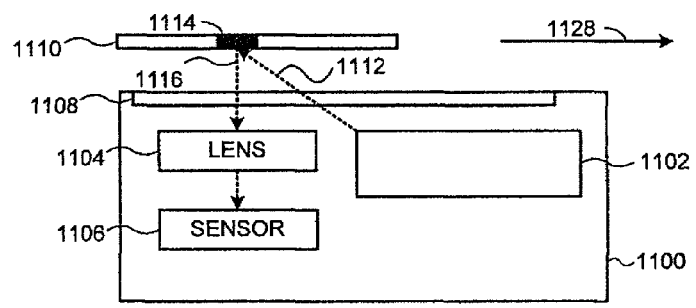
Figures 2, 11:
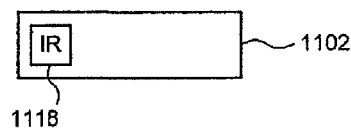
Figures 3, 11:
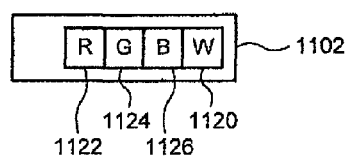
Figures 4, 11:
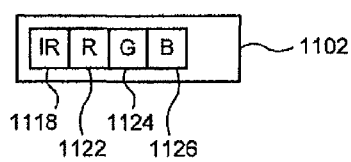
Figures 5, 11:
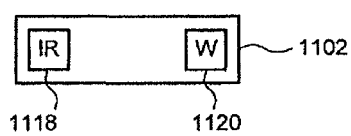

FIG. 11-1 is a simplified illustration of an optical arrangement in an imaging device 1100. Imaging device 1100 comprises a light source 1102, one or more lenses 1104, an optical sensor 1106 and a cover 1108. A document 1110 to be scanned may be placed over cover 1108. Document 1110 may be any document, for example, a payment item. A non-exhaustive list of examples of such a payment item includes a check, a money order, a bank draft, an inter-member debit, a settlement voucher, a government savings bond, a gift certificate, a paper pre-authorized debit a lottery ticket and the like.

Light 1112 may be radiated from light source 1102 through cover 1108 and may be incident on a portion 1114 of document 1110. In response, light 1116 may be reflected and/or emitted from portion 1114 of document 1110, and may be directed via lenses 1104 to sensor 1106 that may capture light 1116.

In one embodiment, sensor 1106 may be a camera sensor, such as a complementary metal-oxide semiconductor (CMOS) sensor or a charge-coupled device (CCD) sensor, and portion 1114 may be an entire surface of document 1110 or a large portion of the surface, captured while document 1110 is stationary relative to cover 1108.

In another embodiment, optical sensor 1106 may be a linear array optical sensor and portion 1114 may be a "line" of document 1110, captured while document 1110 is stationary relative to cover 1108. To capture more lines of document 1110, the position of document 1110 relative to cover 1108 has to change. Therefore, a mechanical arrangement (not shown) may mechanically advance document 1110 from one position to another in direction 1128 (or in the opposite direction) in increments of lines. Alternatively, a mechanical arrangement (not shown), may mechanically advance imaging device 1100 in direction 1128 (or in the opposite direction) relative to document 1110 in increments of lines. Line images may be combined to produce a larger image of a surface of document 1110.

FIG. 11-2 is an illustration of one example of light source 1102, wherein light source 1102 comprises an IR light source 1118, and sensor 1106 is responsive to IR light. This may be the case, for example, for infrared-light imaging device 724.

FIG. 11-3 is an illustration of another example of light source 1102, wherein light source 1102 comprises one or more light sources in the visible light range, and sensor 1106 is responsive to visible light. This may be the case, for example, for visible-light imaging device 722. For example, light source 1102 may comprise a wide spectrum light source 1120 (also known as a white light source), that emits light in most of the visible spectrum (also known as the white visible range of the radiation spectrum). In another example, light source 1102 may comprise any combination of a red light source 1122, a green light source 1124, and a blue light source 1126.

FIG. 11-4 is an illustration of another example of light source 1102, wherein light source 1102 comprises IR light source 1118 and any combination of red light source 1122, green light source 1124 and blue light source 1126, and sensor 1106 is responsive to infrared light and to visible light. This may be the case, for example, for imaging device 618.

FIG. 11-5 is an illustration of another example of light source 1102, wherein light source 1102 comprises IR light source 1118 and wide spectrum light source 1120, and sensor 1106 is responsive to infrared light and to visible light. This may be the case, for example, for imaging device 618.

Other combinations and configurations of light sources are also contemplated. For example, imaging device 1100 may be able to generate black and white or grayscale images using visible light sources. Any of light sources 1118, 1120, 1122, 1124 and 1126 may be a single light source or an array of light sources. Any of light sources 1118, 1120, 1122, 1124 and 1126 may comprise light emitting diodes (LEDs), fluorescent bulbs or any other type of light source.

Figure 12:
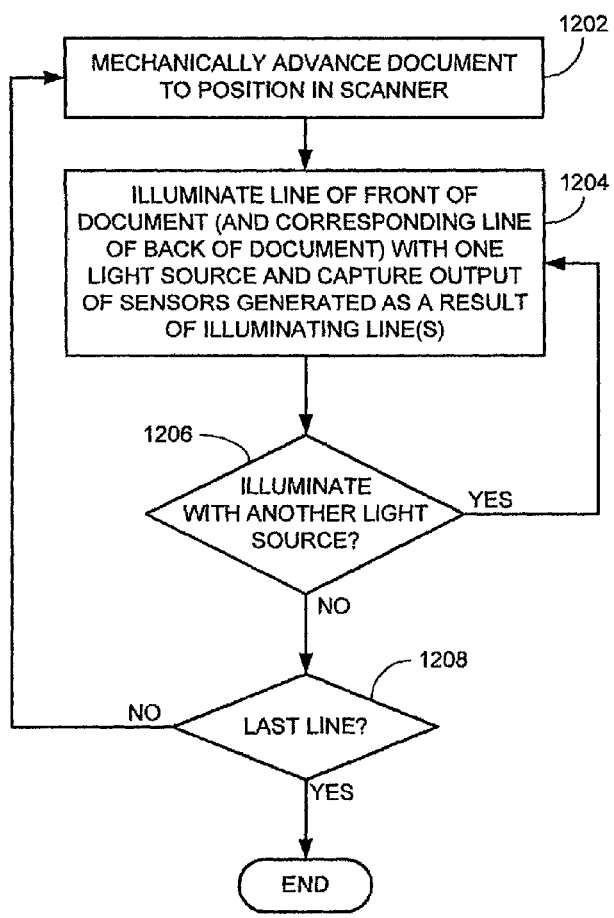
FIG. 12 is an illustration of a method for scanning a document in a scanner having an infrared light source, one or more visible light sources, and sensors that are responsive to at least a visible range of the radiation spectrum and to at least an infrared range of the radiation spectrum.

FIG. 12 is an illustration of a method for scanning a document in a scanner having an infrared light source, one or more visible light sources, and sensors that are responsive to at least a visible range of the radiation spectrum and to at least an infrared range of the radiation spectrum. At 1202, the document is mechanically advanced to a position in the scanner. While the document is at the position, and without further mechanically advancing the document, a line of the front of the document is illuminated, one light source at a time, with the infrared light source and at least one of the one or more visible light sources. Output of sensors generated as a result of illuminating the line, one light source at a time, is captured. Since the sensors are responsive to the visible range and the infrared range, it is inherent in this method than when one light source is illuminating the line, the other light sources are off or are directed elsewhere or are otherwise prevented from illuminating the line. This method is represented in FIG. 12 as an inner loop involving illumination of a line with one of the light sources and capturing output of the sensors generated as a result of illuminating the line at 1204, and checking at 1206 whether to illuminate with another light source. There is also an outer loop involving checking at 1208 whether there is another line to be scanned. If so, the method resumes from 1202. As explained above, line-by-line scanning may be done one horizontal line at a time or one vertical line at a time.

For example, if the scanner has an IR light source and a white light source, the method may be implemented by mechanically advancing the document to a particular position in the scanner, illuminating a line of the front of the document with the IR light source and capturing the output of the sensors generated from illuminating the line with the IR light source, then subsequently illuminating the line with the white light source and capturing the output of the sensors generated from illuminating the line with the white light source, then subsequently mechanically advancing the document to another position in the scanner. Each line will therefore be scanned twice—once with IR light and once with white light.

In another example, if the scanner has an IR light source, a red light source and a green light source, the method may be implemented by mechanically advancing the document to a particular position in the scanner, illuminating a line of the front of the document with the red light source and capturing the output of the sensors generated from illuminating the line with the red light source, then subsequently illuminating the line with the IR light source and capturing the output of the sensors generated from illuminating the line with the IR light source, then subsequently illuminating the line with the green light source and capturing the output of the sensors generated from illuminating the line with the green light source, then subsequently mechanically advancing the document to another position in the scanner. Each line will therefore be scanned three times—once with IR light, once with red light and once with green light. It will be obvious how to modify this example if the scanner has an IR light source, a red light source, a green light source and a blue light source, so that each line is scanned four times—once with IR light, once with red light, once with green light, and once with blue light, although not necessarily in that order.

If the scanner is capable also of illuminating the back of the document, then the method may optionally include, while illuminating the line, one light source at a time, with the one of the or more visible light sources, also illuminating a corresponding line of the back of the document and capturing output of additional sensors that is generated as a result of illuminating the corresponding line. The additional sensors are responsive to at least the visible range. The corresponding line of the back of the document is most likely but not necessarily at the same location in the document as the line of the front of the document.

Figure 13:
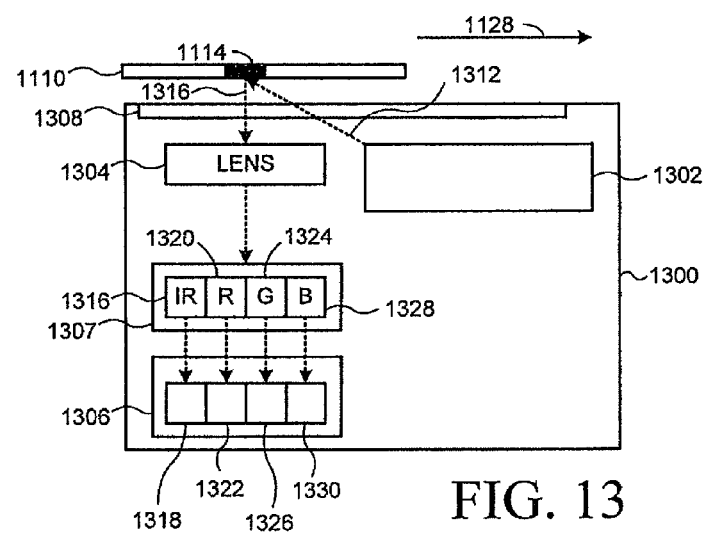
FIG. 13 is a simplified illustration of another optical arrangement in an imaging device.

FIG. 13 is a simplified illustration of an optical arrangement in an imaging device 1300. Imaging device 1300 comprises a light source 1302, one or more lenses 1304, an optical sensor 1306, a filter array 1307, and a cover 1308. Document 1110 to be scanned may be placed over cover 1308. Light 1312 may be radiated from light source 1302 through cover 1308 and may be incident on portion 1114 of document 1110. In response, light 1316 may be reflected and/or emitted from portion 1114 of document 1110, and may be directed via lenses 1304 and filter array 1307 to sensor 1306 that may capture light 1316. Filter array 1307 is optically coupled to sensor 1306.

In one embodiment, sensor 1306 may be a camera sensor, such as a CMOS sensor or a CCD sensor, and portion 1114 may be an entire surface of document 1110 or a large portion of the surface, captured while document 1110 is stationary relative to cover 1308.

In another embodiment, optical sensor 1306 may be a linear array optical sensor and portion 1114 may be a "line" of document 1110, captured while document 1110 is stationary relative to cover 1308. To capture more lines of document 1110, the position of document 1110 relative to cover 1308 has to change. Therefore, a mechanical arrangement (not shown) may mechanically advance document 1110 from one position to another in direction 1128 (or in the opposite direction) in increments of lines. Alternatively, a mechanical arrangement (not shown), may mechanically advance imaging device 1300 in direction 1128 (or in the opposite direction) relative to document 1110 in increments of lines. Line images may be combined to produce a larger image of a surface of document 1110.

In one embodiment, imaging device 1300 is capable of capturing infrared images. Light source 1302 therefore emits at least IR light and sensor 1306 is responsive to a spectrum that includes an infrared range. Filter array 1308 includes IR optical filters 1316 to filter out all but the infrared range, so that only the IR component of light 1316 is passed to sensing cells 1318 of sensor 1306. This may be the case, for example, for infrared-light imaging device 724.

In another embodiment, imaging device 1300 is capable of capturing visible light images. Light source 1302 therefore emits light in at least most of the visible spectrum, and sensor 1306 is responsive to at least the visible spectrum. Filter array 1308 includes optical filters to filter out all but the visible range, so that only the visible component of light 1316 is passed to sensor 1306. In this case, sensor 1306 need not include sensing cells 1318. For example, filter array 1308 includes red optical filters 1320 to filter out all but the red range of the radiation spectrum, so that only the red component of light 1316 is passed to sensing cells 1322 of sensor 1306; green optical filters 1324 to filter out all but the green range of the radiation spectrum, so that only the green component of light 1316 is passed to sensing cells 1326 of sensor 1306; and blue optical filters 1328 to filter out all but the blue range of the radiation spectrum, so that only the blue component of light 1316 is passed to sensing cells 1330 of sensor 1306. This may be the case, for example, for visible-light imaging device 722. In another example, filter array 1308 includes any combination of red optical filters 1320, green optical filters 1324 and blue optical filters 1326.

In yet another embodiment imaging device 1300 is capable of capturing infrared images and visible light images, as for example, with imaging device 618. Light source 1302 therefore emits light in an infrared range of the radiation spectrum and in a visible range of the radiation spectrum. Sensor 1306 is responsive to the infrared range and to the visible range, comprising, for example, sensing cells 1318 responsive to the infrared range and sensing cells responsive to the visible range or a portion thereof. Filter array 1308 includes IR filters 1316 and any combination of red optical filters 1320, green optical filters 1324 and blue optical filters 1328 that corresponds to sensing cells in sensor 1306.

Other combinations and configurations of light sources, optical filters and sensing cells are also contemplated. For example, imaging device 1300 may be able to generate black and white or grayscale images. Light source 1302 may be a single light source or an array of light sources. Light source 1302 may comprise light emitting diodes (LEDs), fluorescent bulbs or any other type of light source.

Figure 14:
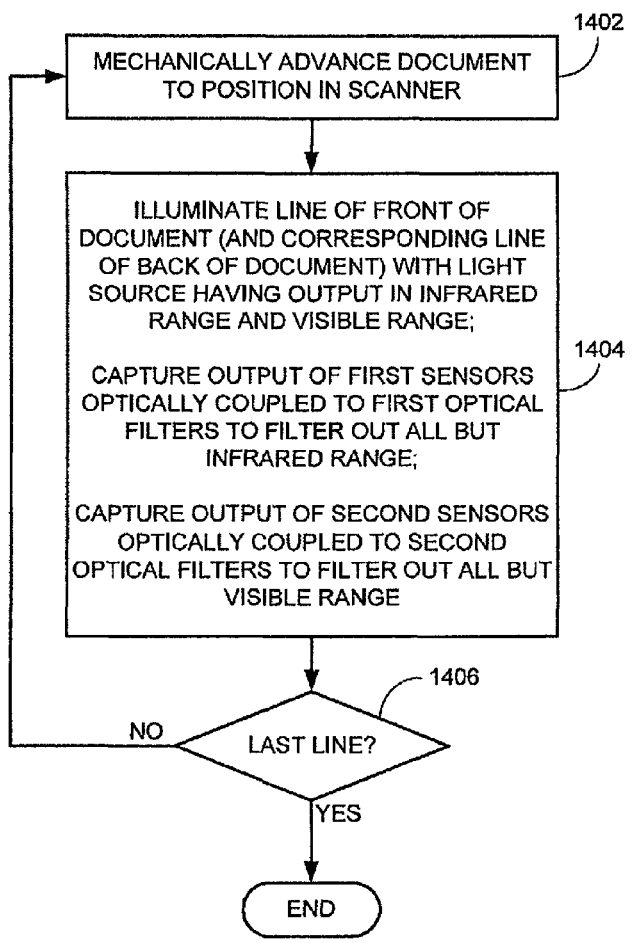
FIG. 14 is an illustration of a method for scanning a document in a scanner comprising a light source with output in an infrared range of the radiation spectrum and output in a visible range of the radiation spectrum.

FIG. 14 is an illustration of a method for scanning a document in a scanner comprising a light source with output in an infrared range of the radiation spectrum and output in a visible range of the radiation spectrum. The scanner also comprises first sensors that are responsive at least to the infrared range and are optically coupled to first optical filters that filter out all but the infrared range. The scanner also comprises second sensors that are responsive at least to the visible range and are optically coupled to second optical filters that filter out all but the infrared range. For example, the visible range may be the red visible range, the green visible range, the blue visible range, or the white visible range.

At 1402, the document is mechanically advanced to a position in the scanner. While the document is at the position, and without further mechanically advancing the document, a line of the front of the document is illuminated with the light source, and output of the first sensors and output of the second sensors is captured at 1404. At 1406, it is checked whether there is another line to be scanned. If so, the method resumes from 1402. As explained above, line-by-line scanning may be done one horizontal line at a time or one vertical line at a time.

For example, if the scanner has a light source with output in an infrared range of the radiation spectrum and output in the red, green and blue visible ranges of the radiation spectrum, this method will enable a color line image and an infrared line image to be generated concurrently or simultaneously.

If the scanner is capable also of illuminating the back of the document then the method may optionally include, while illuminating the line with light source, also illuminating a corresponding line of the back of the document and capturing output of third sensors that is generated as a result of illuminating the corresponding line. The third sensors are responsive to at least the visible range and are optically coupled to third optical filters to filter out all but the visible range.

Figure 15:
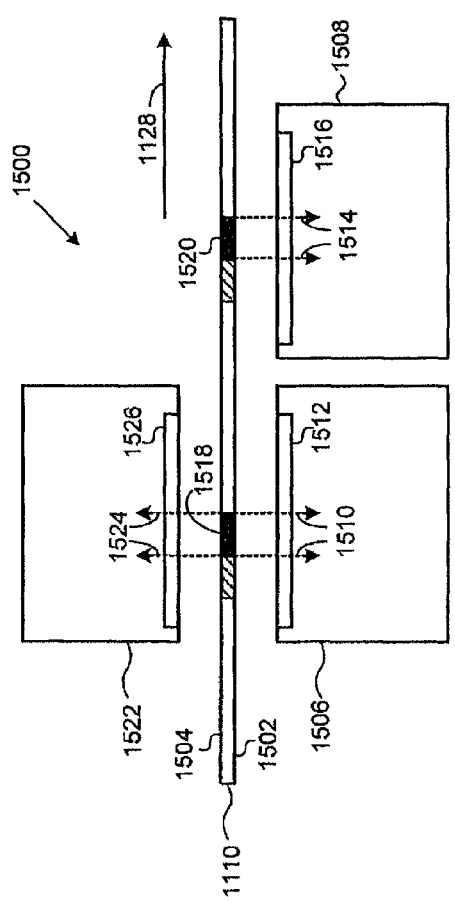
FIG. 15 is an illustration of a scanner.

FIG. 15 is an illustration of a scanner 1500. Document 1110 has a front surface 1502 and a back surface 1504. Scanner 1500 comprises imaging devices 1506 and 1508 for scanning front surface 1502. Imaging device 1506 may be configured, for example, as imaging device 1100 or as imaging device 1300 or as any variation thereof. Imaging device 1508 may be configured, for example, as imaging device 1100 or as imaging device 1300 or as any variation thereof. Although illustrated as separate devices, imaging device 1506 and imaging device 1508 may share various components.

Arrows 1510 represent an area in a cover 1512 of imaging device 1506 through which a line can be imaged by imaging device 1506. Similarly, arrows 1514 represent an area in a cover 1516 of imaging device 1508 through which a line can be imaged by imaging device 1508.

At a particular position of document 1110 in scanner 1500, a line 1518 of document 1110 is aligned with the area represented by arrows 1510, and a line 1520 of document 1100 is aligned with the area represented by arrows 1514. While document 1110 is stationary at that position, imaging device 1506 may generate a front image of the front of line 1518 using visible light, and imaging device 1508 may generate an infrared image of the front of line 1520 using infrared light. Generating the front image using visible light may, for example, involve separate red, green and blue images, or may involve a black and white image.

Therefore, as document 1110 is mechanically advanced to different positions in scanner 1500, for example, in direction 1128, imaging devices 1506 and 1508 may be able to image the same lines of surface 1502, although at different times. If necessary, software 628 can then combine the two images appropriately.

Scanner 1500 may optionally comprise an imaging device 1522 for scanning back surface 1504. Imaging device 1522 may be configured, for example, as imaging device 1100 or as imaging device 1300 or as any variation thereof Although illustrated as separate devices, imaging device 1506 and imaging device 1522 may share various components.

Arrows 1524 represent an area in a cover 1526 of imaging device 1522 through which a line can be imaged by imaging device 1522. At a particular position of document 1110 in scanner 1500, line 1518 of document 1110 is aligned with the area represented by arrows 1510 and with the area represented by arrows 1524. In this sense, line 1518 of the back surface 1504 of document 1110 corresponds to line 1518 of the front surface 1502 of document 1110. While document 1110 is stationary at that position, imaging device 1522 may generate a back image of the back of line 1518 using visible light. Generating the back image using visible light may, for example, involve separate red, green and blue images, or may involve a black and white image.

Figure 16:
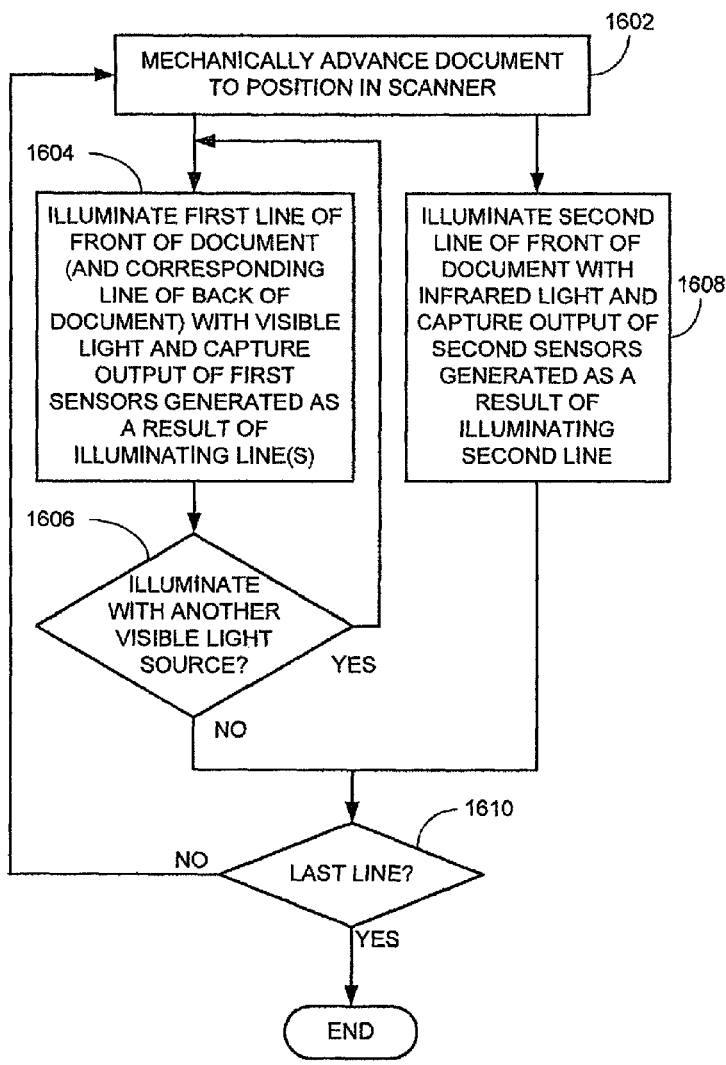
FIG. 16 is an illustration of a method for scanning a document in a scanner having an infrared light source and one or more visible light sources.

FIG. 16 is an illustration of a method for scanning a document in a scanner having an infrared light source and one or more visible light sources. The scanner also comprises first sensors that are responsive to at least a visible range of the radiation spectrum, and second sensors that are responsive to at least an infrared range of the radiation spectrum.

At 1602, the document is mechanically advanced to a position in the scanner. While the document is at the position, and without further mechanically advancing the document, a first line of the front of the document is illuminated with at least one of the one or more visible light sources, and output of the first sensors is captured at 1604. If the one or more visible light sources comprise two or more visible light sources having different spectral outputs, for example, a red light source and a green light source, or in another example, a red light source, a green light source and a blue light source, then it is checked at 1606 whether to illuminate the first line with another of the visible light sources. If so, the method returns to 1602, so that output of the first sensors resulting from illumination of the first line with the other of the visible light sources can be captured.

While the document is at the position, and without further mechanically advancing the document, a second line of the front of the document is illuminated with the infrared light source, and output of the second sensors is captured at 1608. The scanning of the first line and the scanning of the second line may occur substantially concurrently, although this is not necessary. For example, if the first line is to be scanned with two visible light sources, one after the other, the second line may be scanned with the infrared light source at any time while the first line is being scanned.

Once the first line is not being illuminated with any other light source and the second line has been illuminated, it is checked at 1606 whether there is another line to be scanned. If so, the method resumes from 1602. As explained above, line-by-line scanning may be done one horizontal line at a time or one vertical line at a time.

If the scanner is capable also of illuminating the back of the document, then the method may optionally include, while illuminating the first line with one of the visible light sources, also illuminating a corresponding line of the back of the document and capturing output of third sensors that is generated as a result of illuminating the corresponding line. The third sensors are responsive to at least the visible range.

Specifications for generating a front image of a payment item may differ from specifications for generating an infrared image of a MICR-line. In addition, different specifications may exist for different uses of the systems and methods described herein.

For example, the specifications for generating a front image of a payment item may include a desired resolution (100, 200, 300 dpi and so on) and a desired type of image (black and white, grayscale, color). The desired resolution may dictate the width of each scanned "line" and hence the amount of motion to be generated by motor 642 in FIGS. 6, 7, 11, 13 and 15. The desired type of image may dictate the type of illumination used to produce the image and the number of "exposures" needed for each scanned line.

As a general example, this will be now demonstrated using light source 1102 of FIG. 11-3. If, for example it is desired to produce a color image, red light source 1122, green light source 1124 and blue light source 1126 may be used separately and in a sequence for each scanned line (i.e. three exposures may be needed for each scanned line). In another example, if it is desired to produce a black and white image, red light source 1122, green light source 1124 and blue light source 1126 may be used together, and only one exposure may be needed for each scanned line. White light source 1120 may be used as an alternative to using red light source 1122, green light source 1124 and blue light source 1126 together.

As a non-limiting example, for the purpose of archiving front images of payment items, in many cases it may be sufficient to produce a black and white image at a resolution of approximately 100-200 dpi. For the purpose of OCR analysis, it is common to require a higher resolution, in the range of 200-300 dpi, and sometimes even 600 dpi.

Generating an infrared image of a MICR-line may require exposure to infrared light, such as light source 1118 of FIG. 11-2. Therefore, in the example of imaging device 1100 of FIG. 11-1, generation of a black and white image and an IR image may require two exposures in a sequence and generation of a color image and an IR image may require four exposures in a sequence.

Figure 17:
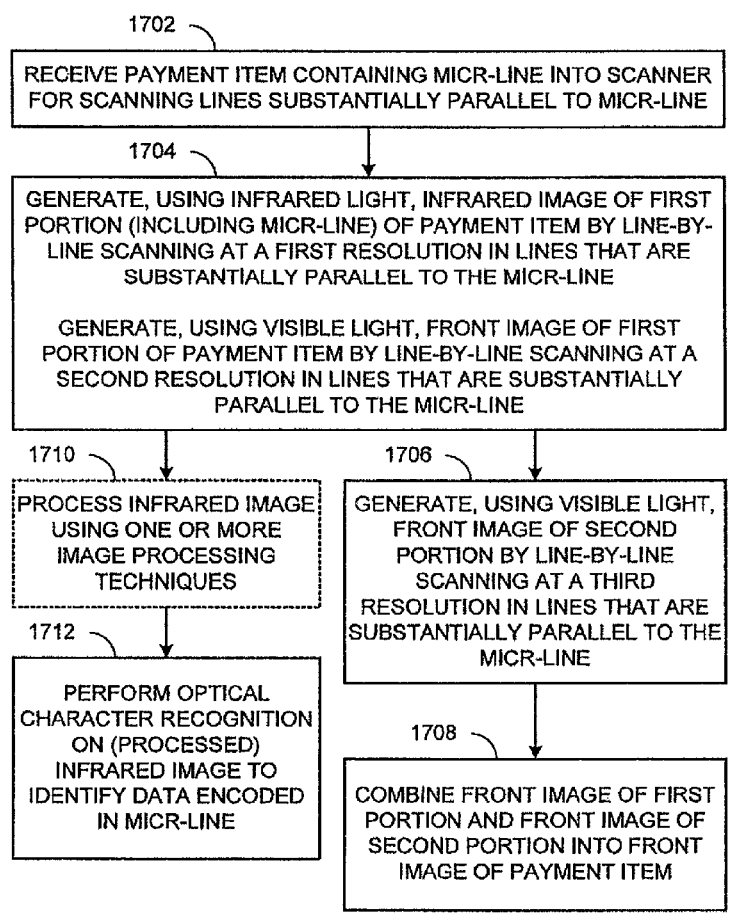
FIG. 17 is another illustration of a method for scanning a document in a scanner having an infrared light source and one or more visible light sources.

FIG. 17 is an illustration of a method for handling a payment item having a MICR-line on its front in a scanner. The method of FIG. 17 may be executed in any combination with any of the methods of FIGS. 8, 9, 10, 12, 14 and 16. For the purpose of clarity, the method of FIG. 17 is explained herein in conjunction with payment item 100 of FIG. 1.

Referring now briefly to FIG. 1, a horizontal line may be defined as extending approximately from side edge 112 of payment item 100 to the opposite side edge 114 of payment item 100, being substantially parallel to top edge 116 of the payment item 100 and being substantially parallel to MICR-line 108. A virtual horizontal line 120 divides payment item 100 into a first portion 122 and a second portion 124, where MICR-line 108 is fully included in first portion 122.

At 1702, payment item 100 is introduced to a scanner for scanning horizontal lines of payment item 100 while scanning first portion 122 prior to scanning second portion 124. The scanner may be, for example, comprised in imaging device 618,722,724.

At 1704, the scanner scans portion 122 line by line to generate an infrared image of portion 122 and a visible light image of portion 122. Mechanical apparatus 644 may generate relative mechanical advancement between the imaging device (e.g. 618, 722, 724) and payment item 100 to support the higher resolution desired for the infrared and visible light images. For example, the desired resolution for the infrared image may be 300 dpi while the desired resolution for the visible light image may be 100 dpi. Consequently, mechanical apparatus 644 may generate relative mechanical advancement of approximately 300 dpi between the imaging devices and payment item 100.

As a non-limiting example, motor 642 may support an even higher resolution of approximately 600 dpi, where advancement for each 600 dpi line may be defined as a single "step" performed by motor 642. In this example, advancement of 300 dpi lines equals two steps of motor 642 and advancement of 100 dpi lines equals six steps of motor 642. Therefore, while scanning portion 122, motor 642 generates advancements of two steps at a time, to support scanning at approximately 300 dpi.

For example, at each 300 dpi line of portion 122, the line may be exposed once to infrared light and once or more than once to visible light, depending on the type of the required visible light image. In this example, both the infrared image of portion 122 and the visible image of portion 122 are at the same resolution. This is helpful, for example, if OCR is to be performed on both the infrared image of portion 122 and the visible light image of portion 122. In the example where 100 dpi resolution is desired for the visible light image, the visible light image of portion 122 may actually have a higher resolution than requested.

In another example, if the resolution desired for the visible light image is lower than the resolution desired for the infrared image, exposure to visible light may be done on only a fraction of the lines in portion 122. This may be appropriate, for example, if OCR is to be performed only on the infrared image of portion 122. To continue the example, exposure to visible light may be done in portion 122 only once per three 300 dpi lines, while exposure to infrared light is done in portion 122 once per 300 dpi line. Limiting the number of exposures to visible light in portion 122 to no more than required to achieve the desired resolution may result in a higher speed of scanning.

The desired resolution for the infrared image may not be a simple multiplication by an integer of the resolution desired for the visible light image. For example, the desired resolution for the infrared image may be 300 dpi while the desired resolution for the visible light image may be 125 dpi. In such an example, visible light scanning of portion 122 may be performed at a resolution supported by motor 642 while scanning at 300 dpi—for example, 150 dpi.

After scanning portion 122 with both visible light and infrared light, at 1706 the scanner continues scanning portion 124 with visible light to generate a visible light image of portion 124. Since scanning portion 124 with infrared light is not required, the scanning resolution for portion 124 may be adjusted. For example, scanning of portion 124 may continue at 150 dpi or may be performed at 125 dpi to match the scanning specifications. At 1708, software 628 combines the visible light image of portion 122 with the visible light image of portion 124 to generate a visible light image of payment item 100.

At 1710, scanner 602 (using software 638) and/or computer 606 (using software 627) may optionally process the infrared image of portion 122 using one or more image processing techniques. At 1712, scanner 602 (using OCR module 640) and/or computer 606 (using OCR module 632) may perform OCR on the infrared image of portion 122. The operations of 1710 and 1712 may occur anytime after generating the infrared image of portion 122. For example, the operations of 1710 and 1712 may overlap the operations of 1706 and/or 1708.

It will be obvious to persons of ordinary skill in the art how to modify the method of FIG. 17 for the scanning of a payment item having a vertical MICR-line. In that case, a virtual vertical line divides the payment item into a first portion and a second portion, where the vertical MICR-line is filly included in the first portion. Scanning of the payment item will be done by vertical lines while scanning the first portion prior to the second portion.

It will be appreciated by persons of ordinary skill in the art that in the case of payment items having a landscape orientation, such as a check, there are advantages to scanning the payment item horizontally rather than vertically. Firstly, the scanning may be faster, since there are fewer horizontal lines than vertical lines to be scanned. Secondly, assuming that, as with a check, the MICR-line of the payment item is horizontal and the portion of the payment item containing the MICR-line is scanned before the rest of the payment item, the image of the MICR-line can be generated, processed and analyzed while the rest of the payment item is being scanned. Thirdly, if the scanner has the form factor to accept the payment item along its long edge, then the scanner can also be used to scan other documents with a width as wide as the payment item's long edge, thus enhancing the utility of the scanner relative to check scanners that cannot scan documents having a form factor other than that of a check.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A method for handling a payment item having a magnetic ink character recognition (MICR)-line, the method comprising:

generating, using visible light, a front image of the front of said payment item;

performing optical character recognition on said front image to identify data encoded in said MICR-line;

determining a level of confidence in identification of said data from said optical character recognition performed on said front image;

generating, using infrared light, an infrared image of the front of said payment item or of a portion of the front of said payment item containing the MICR-line; and performing optical character recognition on said infrared image to identify said data encoded in said MICR-line, wherein generating said infrared image and performing optical character recognition on said infrared image are done only if said level of confidence is less than a predetermined threshold.

2. The method of claim 1, wherein generating said front image comprises scanning the front of said payment item using visible light, and generating said infrared image comprises scanning said portion or the front of said payment item using infrared light.

3. The method of claim 1, wherein generating said front image comprises digitally photographing the front of said payment item using visible light, and generating said infrared image comprises digitally photographing said portion or the front of said payment item using infrared light.

4. A method for handling a payment item having a magnetic ink character recognition (MICR)-line, the method comprising:

generating, using visible light, a front image of the front of said payment item;

processing said front image using one or more image processing techniques;

performing optical character recognition on said processed front image to identify data encoded in said MICR-line;

determining a level of confidence in identification of said data from said optical character recognition performed on said processed front image;

generating, using infrared light, an infrared image of the front of said payment item or of a portion of the front of said payment item containing the MICR-line;

performing optical character recognition on said infrared image to identify said data encoded in said MICR-line, wherein performing optical character recognition on said infrared image is done only if said level of confidence is less than a predetermined threshold.

5. A system for handling a payment item having a magnetic ink character recognition (MICR)-line, the system comprising:

a first imaging device to generate, using visible light, a front image of the front of said payment item and a back image of the back of said payment item;

a second imaging device to generate, using infrared light, an infrared image of a portion of the front of said payment item containing the MICR-line, wherein the portion is less than the front of said payment item and includes the MICR-line; and a computer-readable medium storing software to be executed on a computer that is coupled via a communication link to said first imaging device and to second imaging device, wherein said software is configured to control said computer to receive said front image and said back image via said communication link and to receive said infrared image via said communication link and to perform optical character recognition on said front image to identify data encoded in said MICR-line, determine a level of confidence in identification of said data from said optical character recognition performed on said front image, and perform optical character recognition on said infrared image of the portion to identify data encoded in said MICR-line only if said level of confidence is less than a predetermined threshold.

6. A system for handling a payment item having a magnetic ink character recognition (MICR)-line, the system comprising:

an imaging device to generate, using visible light a front image of the front of said payment item and a back image of the back of said payment item, and to generate, using infrared light, an infrared image of a portion of the front of said payment item containing the MICR-line, wherein the portion is less than the front of said payment item and includes the MICR-line; and a computer-readable medium storing software to be executed on a computer that is coupled via a communication link to said imaging device, wherein said software is configured to control said computer to receive said front image and said back image via said communication link and to receive said infrared image via said communication link and to perform optical character recognition on said front image to identify data encoded in said MICR-line, determine a level of confidence in identification of said data from said optical character recognition performed on said front image, and perform optical character recognition on said infrared image of the portion to identify data encoded in said MICR-line only if said level of confidence is less than a predetermined threshold.

7. The system of claim 6, wherein said imaging device comprises a scanner.

8. The system of claim 7, wherein said scanner is to generate said front image, said back image and said infrared image in a single pass of said payment item through said scanner.

9. The system of claim 7, wherein said scanner is to scan said payment item horizontally, so that said front image, said back image and said infrared image are generated one horizontal line at a time, where each horizontal line extends approximately from one short edge of said payment item to the opposite short edge of said payment item and is substantially parallel to a long edge of said payment item.

10. The system of claim 6, wherein said imaging device comprises:

an infrared light source having output in an infrared range of the radiation spectrum;

at least one visible light source having output in a visible range of the radiation spectrum; and sensors that are responsive to said visible range or a portion thereof and to said infrared range.

11. The system of claim 6, wherein said imaging device comprises:

a light source having output in an infrared range of the radiation spectrum and output in a visible range of the radiation spectrum;

sensors that are responsive to said infrared range and that are optically coupled to optical filters to filter out all but said infrared range; and sensors that are responsive to said visible range and that are optically coupled to optical filters to filter out all but said visible range or a portion thereof.

12. A method for scanning a payment item having a magnetic ink character recognition (MICR)-line, the method comprising:

receiving said payment item into a scanner for scanning lines substantially parallel to said MICR-line;

generating, using infrared light, an infrared image of a portion of a front of said payment item, wherein said MICR-line is contained in said portion, by line-by-line scanning at a first resolution in lines that are substantially parallel to said MICR-line;

generating, using visible light, a visible image of said portion by line-by-line scanning at a second resolution in lines that are substantially parallel to said MICR-line;

generating, using visible light, a visible image of a remaining portion of said front of said payment item by line-by-line scanning at a third resolution in lines that are substantially parallel to said MICR-line;

performing optical character recognition on said visible image of said portion to identify data encoded in said MICR-line;

determining a level of confidence in identification of said data from said optical character recognition performed on said visible image of said portion; and performing optical character recognition on said infrared image to identify data encoded in said MICR-line only if said level of confidence is less than a predetermined threshold.

* * * * *